United States Patent [19]
Hauser et al.

[11] 3,940,465
[45] Feb. 24, 1976

[54] METHOD FOR REGULATING THE HARDENING TIME OF A PLASTIC MASS IN THE MOLD OF AN INJECTION MOLDING MACHINE

[75] Inventors: Hans Ulrich Hauser, Niederweningen; Eduard Hartmann, Urdorf, both of Switzerland

[73] Assignee: Bucher-Guyer AG, Maschinenfabrik, Niederweningen, Switzerland

[22] Filed: Dec. 17, 1973

[21] Appl. No.: 425,607

[30] Foreign Application Priority Data
Jan. 3, 1973    Germany............................ 2300171

[52] U.S. Cl. .................. 264/40; 264/328; 425/150; 425/167
[51] Int. Cl.² .......................................... B29F 1/00
[58] Field of Search ...... 264/40, 328, 329; 425/150, 425/167

[56]         References Cited
         UNITED STATES PATENTS
3,345,441    10/1967    Dibdin ................................. 264/40
3,773,451    11/1973    Bielfeldt et al. ................ 264/328 X FOREIGN PATENTS OR APPLICATIONS
1,233,579    2/1967    Germany ............................. 264/40
2,050,804    4/1971    France ................................. 264/40

*Primary Examiner*—Jan H. Silbaugh
*Attorney, Agent, or Firm*—Werner W. Kleeman

[57]         ABSTRACT

A method of regulating the hardening or setting time of a plastic mass in a mold of an injection molding machine, wherein during a relative movement between two mold halves in the presence of the pressure of the plastic mass the hardening time of the mass is regulated in the mold cavity as a function of the recuperation or recovery of such relative movement.

5 Claims, 2 Drawing Figures

3,940,465

METHOD FOR REGULATING THE HARDENING TIME OF A PLASTIC MASS IN THE MOLD OF AN INJECTION MOLDING MACHINE

BACKGROUND OF THE INVENTION

The present invention relates to a new and improved method of regulating the hardening or setting time of a plastic mass in a mold of an injection molding machine and also concerns an improved construction of apparatus for the performance of the aforesaid method aspects.

With the presently generally known injection molding machines the hardening or setting process of the mass to be worked in the injection mold is controlled with a pre-selected, invariable time course during the operation of the machine. Under the expression "hardening time" or "setting time" there is to be understood the residence time of the mass in the mold from the time that the mass is injected until it is molded into a finished molded article. Not only too short hardening times but also too long hardening times can have a negative effect upon the quality of the molded parts or articles. Due to the fluctuations in the quality of the mass which is to be processed it is necessary to also calculate for the hardening or setting time a safety margin, resulting in loss in time and energy.

SUMMARY OF THE INVENTION

Hence, it is a primary object of the present invention to provide an improved method of regulating the hardening time of plastic masses in a mold of an injection molding machine.

Another and more specific object of the present invention aims at an improved method of regulating the hardening time of a plastic mass in a mold of an injection molding machine so as to effectively overcome the aforementioned drawbacks and limitations of the prior art proposals and to provide improvements in the quality of the molded parts while simultaneously reducing the cycle or operating times.

Yet a further significant object of the present invention relates to an improved method of controlling the hardening time of plastic masses during injection molding so as to provide for improved economies in the molding process, a better and particularly more uniform quality of the molded articles, and affording a more controlled and predictable injection molding process.

Another object of this invention aims at regulating the hardening time of the plastic mass in a mold according to a magnitude or parameter which is influenced by the hardening or setting process.

The invention makes use of the recognition that under the influence of the pressure of the mass in the injection mold there is brought about a certain bending-through or buckling of the mold support or a slight opening of the mold, whereby a mold separation gap of very small dimensions thus exists between the mold halves. It has now been surprisingly found that a mold separation movement triggered by the action of the pressure of the mass, following the injection molding operation, is influenced by the behavior of the injected mass during the hardening or setting process. During the solidification of the mass there occurs a contraction of such mass, by means of which the pressure of the mass is reduced within the mold cavity. This reduction in pressure results in the fact that the mold separation gap recovers or recuperates during hardening or setting of the plastic mass.

The method aspects of this development are predicated upon the use of this effect which has been recognized, and specifically according to the method it is contemplated that during a relative movement which occurs between two mold halves under the pressure of the plastic mass there is regulated the hardening time of the mass in the mold cavity according to the recovery or recuperation of such relative movement.

Not only is the invention concerned with the aforementioned method aspects but also contemplates a new and improved construction of apparatus for the performance of such method which is manifested by the features that at least one measuring element is mounted at the injection mold or at a part which is physically or bodily connected with the injecton mold, and by means of measurement values determined by the measuring element there is controlled through the agency of a regulation device and a control element a mold closure unit in the sense of opening the mold.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
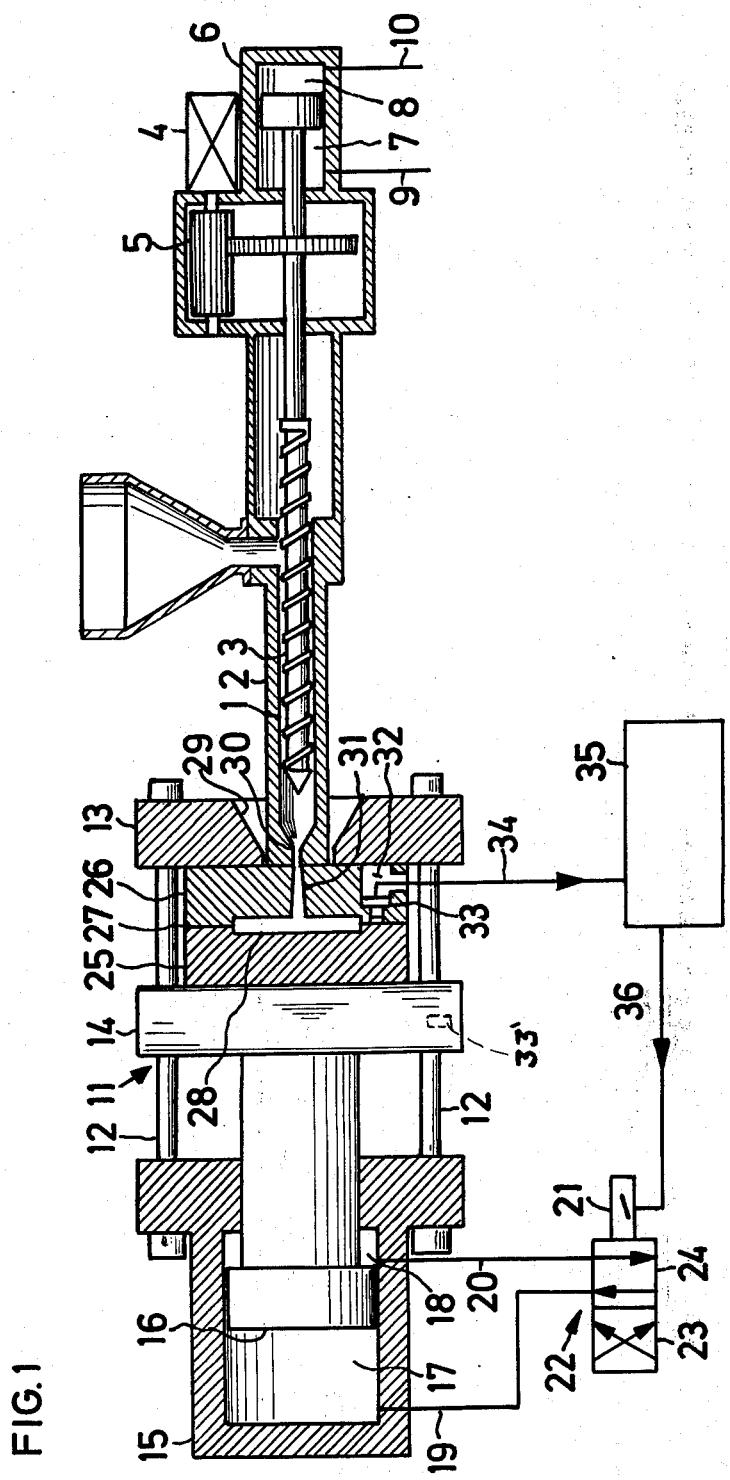
FIG. 1 is a schematic illustration of a regulation device at a worm-type or screw injection molding machine shown in vertical longitudinal sectional view.

Describing now the drawings, with the screw or worm-injection molding machine depicted in FIG. 1 a plasticizing screw or worm 3 is located in a substantially cylindrical compartment or chamber 1 of a plasticizing cylinder 2. For the purpose of plasticizing the mass of plastic material which is to be worked this plasticizing worm or screw 3 can be rotatably driven by means of a suitable drive motor 4 through the agency of a gear transmission 5 and for the purpose of carrying out the injection of the material mass can be moved so as to carry out an axial displacement motion by means of an hydraulic oil double-acting displacement or stroke device 6. By means of two lines or conduits 9 and 10 which open into the displacement or stroke compartments 7 and 8 the displacement device 6 can be selectively impinged by the pressurized medium in two displacement directions by means of any suitable and therefore not particularly illustrated hydraulic source via a non-depicted conventional control element.

A mold closure unit 11 which is located in the axial extension of the plasticizing cylinder 2 is equipped with a mold support or carrier 13 fixedly anchored at the columns or rods 12 as well as a mold support 14 which is mounted so as to be axially movable at these columns 12. This last-mentioned mold support 14 can be axially displaced by means of a pressurized medium impinged closure piston 16 located in a closure cylinder 15. Two conduits or lines 19 and 20 which open into the displacement chambers or compartments 17 and 18 are connected with a control valve 22 which is supplied by a suitable source of hydraulic fluid medium and which control valve 22 can be switched or actuated by the electromagnet 21. Due to the action of the control valve 22 the closure piston 21 can be shifted into one position, indicated by the position of the valve identified by reference numeral 23, constituting the mold open position and into another position, indicated by reference character 24, constituting the closed or closure position.

Both of the mold carriers or supports 13 and 14 support a respective mold half 25 and 26, which when the mold 25, 26 is closed flatly bear against one another at a mold separation or parting plane 27 and collectively enclose a mold cavity or compartment 28 in which there is formed the molded article or part. The plasticizing cylinder 2 piercingly extends through a recess or opening 29 of the stationary mold support 13 and by means of an injection nozzle 30 is in flow communication with a pouring cone 31 of the mold half 26.

A contactless, inductive measuring or measurement element 33 is arranged in a bore 32 of the mold half 26. This measuring element 33 functions such that even with the slightest formation of a gap at the mold parting or separation plane 27 there is generated a change in the induced or inductive voltage. In the closed position of the mold the mold half 25 is pressed against the mold half 26 owing to the displacement force of the closure piston 16 which acts upon the movable mold support or carrier 14. During the injection molding operation the pressure of the moldable mass is effective in the mold cavity or compartment 28, this pressure opposing the force of the closure piston 16 which tends to hold the mold 25, 26 closed, and accordingly such pressure has the tendency of separating both mold halves 25 and 26 from one another and forming a gap between both such mold halves at the mold parting or separation plane 27. Apart from the foregoing effect the pressure of the mass causes a certain bending-through or buckling of the mold supports 13 and 14, which likewise contribute to the formation of the gap at the mold separation plane 27. Due to the thus resulting mold separation gap there is produced a voltage change at the measurement or measuring element 33. The thus produced measurement value is transmitted via a measurement line or conductor 34 to a regulation or control device 35 which is electrically coupled through the agency of a control line 16 with the electromagnet 21. The measurement element could be also conceivably arranged at a component bodily connected with the mold, such as at one of the mold supports 13 or 14, or both, as schematically indicated by reference numeral 33'.

Figure 2:
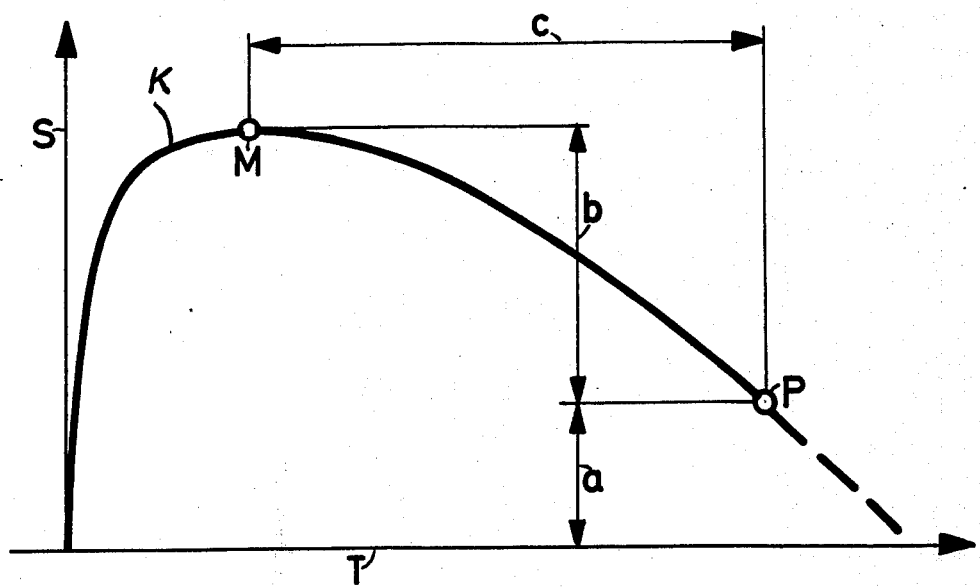
FIG. 2 is a graph showing the course of the mold gap movement.

Considering now the graph or diagram depicted in FIG. 2 it should be understood that along the abscissa there has been plotted by reference character T the time during which, during the injection molding operation and during the subsequent hardening or setting process, the mass completes the mold separation movement between both of the mold halves 25 and 26 which produce the mold separation gap. Along the ordinate the reference numeral S designates the path of the mold separation movement. During the time T there is completed a mold gap movement according to the course of the curve K. From the characteristic of the curve K it will be seen that under the action of the injection molding pressure there is realized during a very short period of time a relatively large mold opening path, which then only still gradually increases, and finally after reaching a maximum value M becomes smaller over a mold closure movement during a relatively longer time. Although the steep ascending curve K at the starting phase is exclusively determined by the injection molding pressure and the injection molding volume, the further course of the curve, following completion of the injection molding operation, is only still influenced by the behavior of the mass during its hardening or setting. It should be appreciated that accompanying the solidification of the fluent mass in the mold cavity or compartment 28 for forming the solid molded article is a contraction of the injection molded mass. Due to this contraction the pressure of the mass within the mold cavity or compartment 28 decreases, so that as best seen by referring to FIG. 2, during the mold closure movement there is initiated a recuperation or recovery of the mold gap at the mold parting or separation plane 27. This mold closure movement as a function of the hardening- or contraction behavior of the plastic mass, and measured by the measuring element 33, is now beneficially employed for regulating the hardening or setting time.

With the start of the series fabrication of a molded article, that is to say, during the so-called start-up or runningin of the mold, there is determined in accordance with the quality of the molded article or part, a point P at which there has been reached a complete degree of hardening of the molded article in a minimum amount of time. This point P can be determined as the absolute value of the path $a$ of the mold closure movement at the mold separation plane 27 between both of the mold halves 25 and 26 as measured by the measuring element 33, or as a differential magnitude $b$ starting from the maximum value M of the mold opening movement, and further, again starting from the maximum value M, by a time factor $c$. One of these values $a$, $b$, or $c$ is introduced as a reference or rated value into the regulation device 35. Now as soon as there has been completed the injection operation and during the hardening process the mass reaches one of the values $a$, $b$ or $c$ along the course of the curve K, then the regulation device 35 triggers a current pulse which permits the electromagnet 21 to switch the control valve 22 from the mold closure position 24 into the mold opening position 23. Consequently, the closure piston 16 shifts or displaces the mold half 25 towards the left into its open position and freely exposes the hardened molded article in the molding cavity or compartment 28 for the mold release operation.

Hence, in contrast to the previously known techniques used in the state-of-the-art injection molding machines, the hardening time of the mass is not of predetermined and invariable length, rather in each cycle can be regulated as a function of the recovery or recuperation of the mold separation movement at the mold separation or parting plane 27 between both of the mold halves 25 and 26. Since quality differences in the mass to be processed influence the hardening- or contraction behavior thereof the hardening or setting time, during operation of the injection molding machine, is specifically accommodated or matched to the state or condition of the mass, so that to insure for an optimum degree of hardening there is not required an excess time for unnecessarily prolonging the hardening time. With minimum hardening time the molded article reaches the complete hardened or set condition and, on the other hand, too long residence of the molded article in the mold cannot disadvantageously influence the quality of the molded article with regard to the hardening delay.

While there is shown and described present preferred embodiments of the invention, it is to be distinctly understood that the invention is not limited thereto, but may be otherwise variously embodied and practiced within the scope of the following claims. ACCORDINGLY,

What is claimed is:

1. A method of regulating the setting time of a thermosetting plastic mass in a mold of an injection molding machine, which mold is constituted by at least two mold halves defining therebetween a mold parting plane and forming a mold cavity, comprising the steps of injecting a thermosetting plastic mass into the mold cavity of the mold, the pressure of the mass in the mold cavity initially causing relative opening movement between the two mold halves, directly sensing the magnitude of a mold gap at the mold parting plane caused by such relative opening movement, and regulating the residence time and therefore the setting time of the thermosetting plastic mass in the mold cavity in response to the sensing of the magnitude of such mold gap and as a function of the recovery of such mold gap due to reclosing of the mold halves caused by the shrinkage of the thermosetting plastic mass as the latter sets.

2. The method as defined in claim 1, including the step of employing as a regulating magnitude for the regulation of the setting time of the mass in the mold cavity the displacement path which is attained during the reclosing movement of the mold.

3. The method as defined in claim 1, including the step of using as a regulating magnitude for regulating the setting time of the mass in the mold cavity a differential magnitude starting from the maximum value of the path of opening movement of the mold.

4. The method as defined in claim 1, including the step of using as the regulating magnitude for the regulation of the setting time of the mass in the mold cavity a time factor measured from the point in time of reaching a maximum value of the opening movement of the mold.

5. A method of regulating the setting time of a plastic mass in a mold of an injection molding machine, which mold is constituted by at least two mold halves defining therebetween a mold parting plane, said two mold halves enclosing a mold cavity, the improvement comprising the steps of: injecting a plastic mass into the mold cavity of the mold, the pressure of the plastic mass in the mold cavity initially causing an opening movement between the two mold halves to form a mold separation gap at the region of the mold parting plane, directly sensing the magnitude of the mold separation gap at the mold parting plane caused by such opening movement of the mold halves, and regulating the residence time and therefore the setting time of the plastic mass in the mold cavity as a function of the recovery of the mold separation gap at the mold parting plane due to reclosing of the mold halves brought about by the contraction of the plastic mass during the time that such plastic mass is setting.

* * * * *